US012619464B2

(12) United States Patent
Boonstoppel et al.

(10) Patent No.: US 12,619,464 B2
(45) Date of Patent: *May 5, 2026

(54) PROGRAM FLOW MONITORING AND CONTROL OF AN EVENT-TRIGGERED SYSTEM

(71) Applicant: NVIDIA Corporation, Santa Clara, CA (US)

(72) Inventors: Peter Alexander Boonstoppel, Pleasanton, CA (US); Michael Cox, Menlo Park, CA (US); Daniel Perrin, Fort Collins, CO (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/603,616

(22) Filed: Mar. 13, 2024

(65) Prior Publication Data

US 2024/0220318 A1     Jul. 4, 2024

Related U.S. Application Data

(63) Continuation of application No. 16/810,557, filed on Mar. 5, 2020, now Pat. No. 11,934,872.

(51) Int. Cl.
| | |
|---|---|
| *G06F 9/48* | (2006.01) |
| *G06F 9/50* | (2006.01) |
| *G06F 9/54* | (2006.01) |
| *G06F 11/30* | (2006.01) |
| *G06F 11/34* | (2006.01) |

(52) U.S. Cl.
CPC .......... *G06F 9/4887* (2013.01); *G06F 9/5038* (2013.01); *G06F 9/542* (2013.01); *G06F 11/3055* (2013.01); *G06F 11/3072* (2013.01); *G06F 11/3495* (2013.01); *G06F 2201/86* (2013.01); *G06F 2201/865* (2013.01)

(58) Field of Classification Search
None
See application file for complete search history.

(56) References Cited

U.S. PATENT DOCUMENTS

| | | | |
|---|---|---|---|
| 9,588,822 B1 | 3/2017 | Shih et al. | |
| 9,898,347 B1 * | 2/2018 | Gupta | .................. G06F 9/5027 |
| 10,552,215 B1 * | 2/2020 | Xu | .......................... G06F 9/526 |

(Continued)

OTHER PUBLICATIONS

Isah et al_A survey of Distributed Data Stream Processing Frameworks, IEEE, 2019, pp. 1-19 (Year: 2019).

(Continued)

*Primary Examiner* — Abu Zar Ghaffari
(74) *Attorney, Agent, or Firm* — IRON SUMMIT IP LLP

(57)                   ABSTRACT

In various examples, a program (e.g., application, algorithm, routine, etc.) may be organized into operational units (e.g., nodes executed by one or more processors), each of which are tasked with executing one or more respective events (e.g., tasks) within the larger program. At least some of the events of the larger program may be successively executed in a flow, one after another, using triggers sent directly from one node to the next. In addition, a manager may exchange communications with the nodes to monitor or assess a status of the system (e.g., determine when a node has completed an event) or to control or trigger a node to initiate an event.

20 Claims, 5 Drawing Sheets

(56) References Cited

U.S. PATENT DOCUMENTS

| 10,630,704 | B1* | 4/2020 | Ghosh | H04L 63/1416 |
| 11,934,872 | B2 | 3/2024 | Boonstoppel et al. | |
| 2002/0188691 | A1 | 12/2002 | Ignatius et al. | |
| 2004/0078105 | A1* | 4/2004 | Moon | G06Q 10/10 |
| | | | | 700/100 |
| 2005/0149908 | A1 | 7/2005 | Klianev | |
| 2007/0192768 | A1 | 8/2007 | Fables et al. | |
| 2008/0046142 | A1* | 2/2008 | Jordan | H04L 12/40195 |
| | | | | 701/36 |
| 2009/0027402 | A1* | 1/2009 | Bakalash | G06T 1/20 |
| | | | | 345/505 |
| 2009/0204694 | A1* | 8/2009 | Kaneko | G06F 9/5038 |
| | | | | 714/48 |
| 2010/0211953 | A1 | 8/2010 | Wakeling et al. | |
| 2015/0134626 | A1* | 5/2015 | Theimer | G06F 11/3055 |
| | | | | 707/693 |
| 2016/0191613 | A1* | 6/2016 | Srinivasan | H04L 67/1008 |
| | | | | 709/201 |
| 2016/0275123 | A1 | 9/2016 | Lin et al. | |
| 2016/0358111 | A1* | 12/2016 | Favre | G06Q 10/04 |
| 2017/0024250 | A1* | 1/2017 | Stanfill | G06F 9/4881 |
| 2017/0102968 | A1 | 4/2017 | Pont | |
| 2017/0255468 | A1* | 9/2017 | Bequet | G06F 9/30181 |
| 2017/0339202 | A1* | 11/2017 | Zhou | H04L 65/60 |
| 2018/0329956 | A1 | 11/2018 | Mittal et al. | |
| 2019/0065254 | A1 | 2/2019 | Ikkaku et al. | |
| 2019/0132387 | A1* | 5/2019 | Singh | H04L 67/12 |
| 2019/0158581 | A1 | 5/2019 | Giannella et al. | |
| 2020/0007157 | A1 | 1/2020 | Indeck et al. | |
| 2020/0125540 | A1 | 4/2020 | Thatte et al. | |
| 2020/0310394 | A1* | 10/2020 | Wouhaybi | H04L 67/12 |
| 2020/0314168 | A1* | 10/2020 | Nauerz | H04L 67/1023 |
| 2020/0403905 | A1 | 12/2020 | Allen et al. | |
| 2021/0117382 | A1 | 4/2021 | Sriharsha | |

OTHER PUBLICATIONS

Boonstoppel, Peter Alexander; Pre-Interview First Office Action for U.S. Appl. No. 16/810,557, filed Mar. 5, 2020, mailed May 31, 2022, 15 pgs.

Boonstoppel, Peter Alexander; First Action Interview Office Action Summary for U.S. Appl. No. 16/810,557, filed Mar. 5, 2020, mailed Aug. 22, 2022, 12 pgs.

Boonstoppel, Peter Alexander; Final Office Action for U.S. Appl. No. 16/810,557, filed Mar. 5, 2020, mailed Jan. 26, 2023, 49 pgs.

Boonstoppel, et al.; Non-Final Office Action for U.S. Appl. No. 16/810,557, filed Mar. 5, 2020, mailed Jul. 20, 2023, 38 pgs.

Boonstoppel, Peter Alexander; Notice of Allowance for U.S. Appl. No. 16/810,557, filed Mar. 5, 2020, mailed Nov. 17, 2023, 9 pgs.

Kopetz, "Event-triggered versus time-triggered real-time systems," In Operating Systems of the 90s and Beyond, pp. 86-101. Springer, Berlin, Heidelberg, 1991.

\* cited by examiner

300

GENERATE A REPRESENTATION OF A PROGRAM INCLUDING
A PLURALITY OF NODES IN AN ORDER, EACH NODE
ASSOCIATED WITH A TASK WITHIN THE PROGRAM
B302

TRANSMIT A NODE-ORIGINATING TRIGGER BETWEEN A
FIRST NODE AND A SECOND NODE SUBSEQUENT TO THE
FIRST NODE IN THE ORDER, THE NODE-ORIGINATING
TRIGGER INDICATING AN EVENT-BASED CONDITION HAS
BEEN MET BASED ON COMPLETION OF A RESPECTIVE TASK
OF THE FIRST NODE
B304

BASED ON THE RESPECTIVE TASK HAVING BEEN
COMPLETED, TRANSMIT AN EVENT REPORT TO A MANAGER
MONITORING EXECUTION OF THE PLURALITY OF NODES
B306

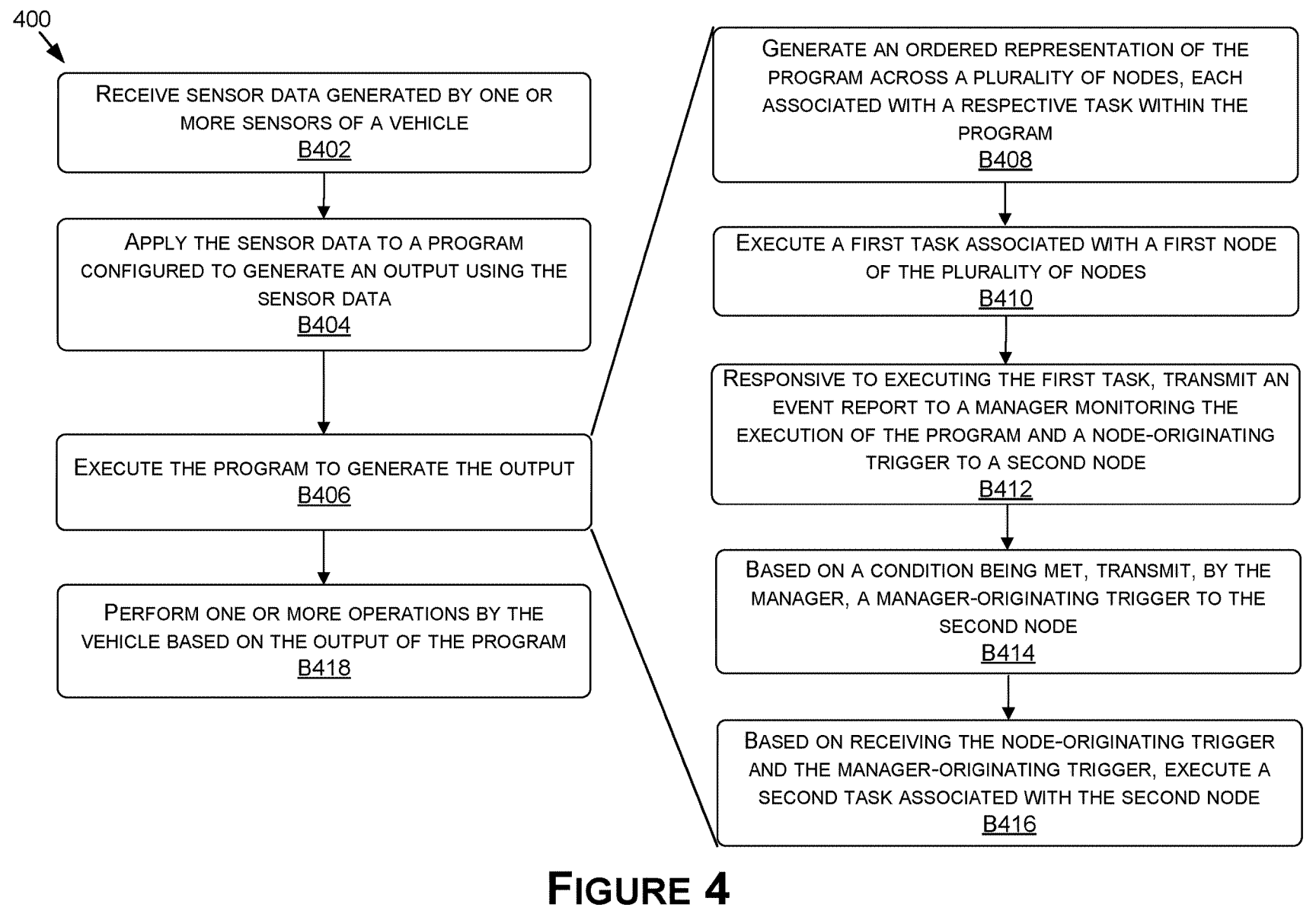

RECEIVE SENSOR DATA GENERATED BY ONE OR MORE SENSORS OF A VEHICLE
B402

APPLY THE SENSOR DATA TO A PROGRAM CONFIGURED TO GENERATE AN OUTPUT USING THE SENSOR DATA
B404

EXECUTE THE PROGRAM TO GENERATE THE OUTPUT
B406

GENERATE AN ORDERED REPRESENTATION OF THE PROGRAM ACROSS A PLURALITY OF NODES, EACH ASSOCIATED WITH A RESPECTIVE TASK WITHIN THE PROGRAM
B408

EXECUTE A FIRST TASK ASSOCIATED WITH A FIRST NODE OF THE PLURALITY OF NODES
B410

RESPONSIVE TO EXECUTING THE FIRST TASK, TRANSMIT AN EVENT REPORT TO A MANAGER MONITORING THE EXECUTION OF THE PROGRAM AND A NODE-ORIGINATING TRIGGER TO A SECOND NODE
B412

BASED ON A CONDITION BEING MET, TRANSMIT, BY THE MANAGER, A MANAGER-ORIGINATING TRIGGER TO THE SECOND NODE
B414

BASED ON RECEIVING THE NODE-ORIGINATING TRIGGER AND THE MANAGER-ORIGINATING TRIGGER, EXECUTE A SECOND TASK ASSOCIATED WITH THE SECOND NODE
B416

PERFORM ONE OR MORE OPERATIONS BY THE VEHICLE BASED ON THE OUTPUT OF THE PROGRAM
B418

FIGURE 4

PROGRAM FLOW MONITORING AND CONTROL OF AN EVENT-TRIGGERED SYSTEM

CROSS-REFERENCE TO RELATED APPLICATIONS

This application is a continuation of U.S. patent application Ser. No. 16/810,557, filed Mar. 5, 2020, which is incorporated herein by reference in its entirety.

BACKGROUND

Computer programs (e.g., applications, algorithms, routines, etc.) are often organized into operational units (e.g., nodes or work nodes executed by programmable engines or hardware engines), and each operational unit provides one or more respective events (e.g., tasks) within the larger program. When executing the program (e.g., processing one or more inputs to arrive at an output), the operational units may be successively executed, one after another. In many instances, completing the events in a predetermined order is helpful, such as when the output of a first event is used as an input to a second event.

Various scheduling approaches may be used to organize events in an order when a program is executed. For example, some systems may use event-triggered scheduling in which, once an operational unit completes an event, the operational unit triggers the next operational unit to complete a subsequent event, and so on. Other systems may use time-triggered scheduling in which a centralized scheduler starts and monitors the execution of every operational unit based on a pre-determined schedule. Each of these scheduling approaches has its own advantages and disadvantages.

For example, the timing of a sequence execution by conventional event-triggered systems is often more dynamic, as compared to a conventional time-triggered system, since the exact timing is variable and is not determined until the actual execution based on various factors (e.g., system load, resource availability, etc.). Conventional event-triggered systems may benefit from high resource utilization, since delay between events can be minimized when operational units directly trigger one another—as opposed to waiting on a central scheduler to trigger events based on a maximum event execution time. However, event-triggered scheduling may experience certain drawbacks. For example, event-triggered systems are often less predictable since schedules may dynamically arise from the actual demand imposed by real-time events. In addition, testing event-triggered systems may be more challenging since the actual load that may be experienced in real-time can be unpredictable, and timeliness is often difficult to verify without testing many scenarios to account for variable runtimes. Furthermore, since operational units directly trigger one another without a central scheduler, an event-triggered system may be more difficult to observe at runtime to ensure correct operation. These various drawbacks—e.g., lower predictability, testability, and observability—make it harder to implement event-triggered systems in various computing environments, such as safety-critical applications that require real-time testability (e.g., autonomous vehicles, semi-autonomous vehicles, artificial intelligence-assisted video monitoring, artificial intelligence-assisted diagnostic and/or surgical devices, etc.).

As another example, conventional time-triggered systems—which use a scheduler to trigger operational units based on predetermined timing and to monitor operational-unit status—are often easier to prove and observe, and are more predictable relative to event-triggered systems. However, since the time slot allotted for each event is typically the maximum possible execution time, time-triggered systems often experience less efficient resource utilization and increased runtimes. Furthermore, additional latency is introduced by the sending and receiving of signals between the operational units and the centralized scheduler. These drawbacks of some conventional time-triggered systems—e.g., longer runtime, lower resource utilization, and added latency—may be undesirable in some types of systems, such as those designed to process a condition at an instant or as close as possible to the actual occurrence of the condition (e.g., in "real-time"). However, because conventional time-triggered systems may experience longer runtimes and lower resource utilization, these systems may be incapable of operating in real-time—a requirement of high-performance systems.

SUMMARY

The present disclosure relates to selectively monitoring and controlling operational units within an event-triggered system. For example, a manager (e.g., module or unit) may be used to monitor and control the event-triggered system and may exchange communications with the operational units. Among other things, the communications may be used to determine a state of the operational unit (e.g., status of an event or task) and/or to trigger an operational unit to initiate an event. As such, each operational unit may be triggered by a previous operational unit, by the manager, or by a combination thereof.

In contrast to conventional event-triggered systems, in which operational units directly trigger one another without a centralized scheduler, the present systems and methods may implement a manager that can be programmed to selectively trigger some of the operational units. Using programmed triggers based on predetermined events (e.g., time-based schedule) may contribute to higher predictability and improved testability. Further, the present disclosure includes sending report communications from operational units to the manager to provide status updates, which may permit the system to be observed at runtime. In addition, since the system of the present disclosure may also selectively use event-based triggers directly from one operational unit to a successive operational unit, the system may also benefit from higher resource utilization and shorter runtime, as compared with a conventional time-triggered system.

BRIEF DESCRIPTION OF THE DRAWINGS

The present systems and methods for monitoring and controlling a program flow in an event-triggered system are described in detail below with reference to the attached drawing figures, which are incorporated herein by reference:

FIG. 3 depicts a flow diagram showing a process for monitoring and control of a program flow, in accordance with some embodiments of the present disclosure;

FIG. 4 depicts a flow diagram showing a process for monitoring and control of a program flow in a vehicle-related computing environment, in accordance with some embodiments of the present disclosure.

DETAILED DESCRIPTION

Figure 1:
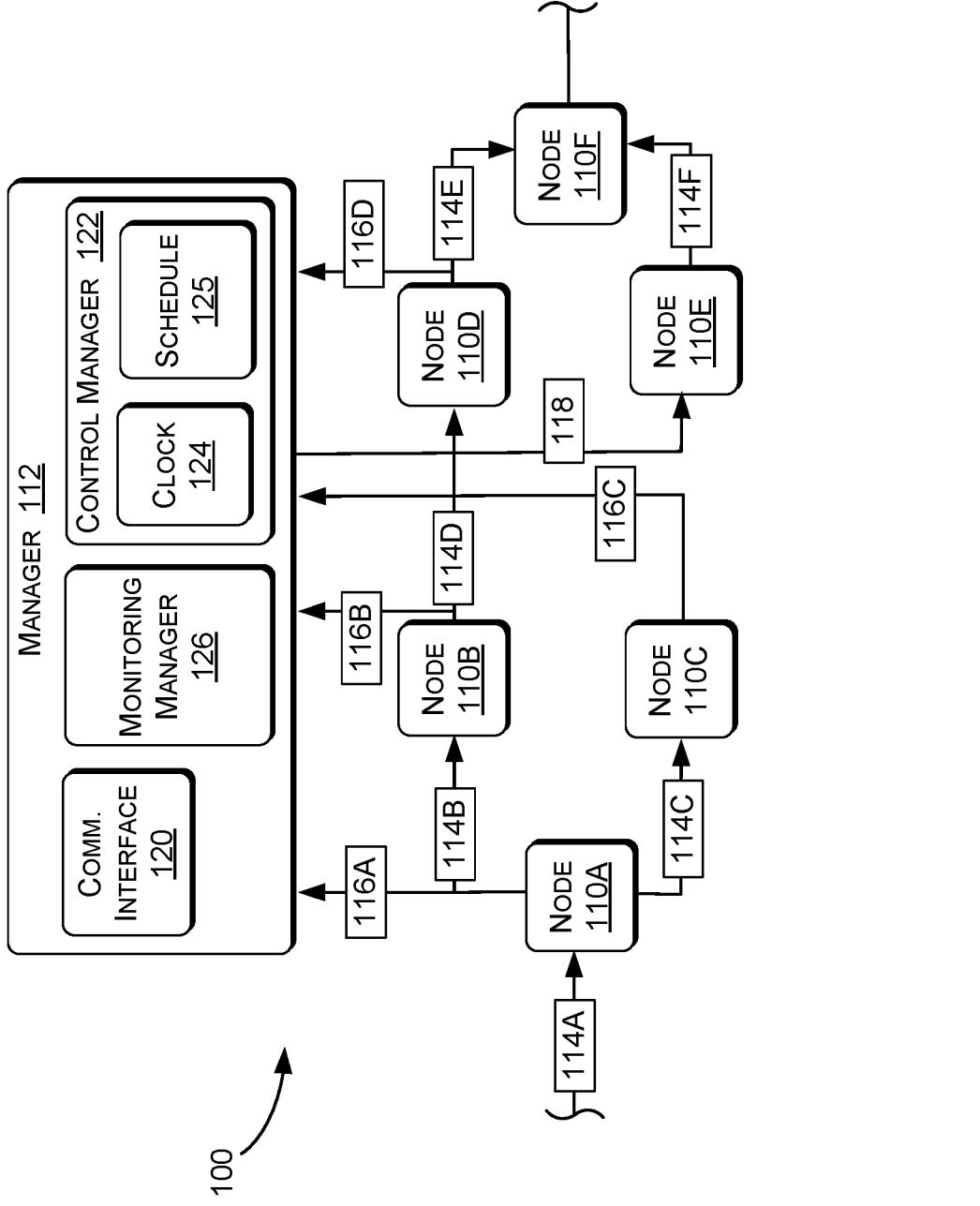
FIG. 1 is a block diagram of a system, including a manager (e.g., module or unit) and a set of nodes, in accordance with some embodiments of the present disclosure.

Systems and methods are disclosed related to monitoring and control of a program flow in an event-triggered system. In accordance with the present disclosure, a program (e.g., application, algorithm, routine, etc.) may be organized into operational units (e.g., nodes or work nodes executed by programmable engines or hardware engines), each of which may provide one or more respective events (e.g., tasks) within the larger program. At least some of the events of the larger program may be successively executed in a flow (e.g., in an order by one operational unit after another). In addition, the system of the present disclosure may include a manager (e.g., software module or unit) built on top of the operational units for monitoring and control. The manager may exchange communications with the operational units to monitor or assess a status of the system (e.g., determine when an operational unit has completed an event) and/or to control or trigger an operational unit to initiate an event.

The system of the present disclosure may be implemented to control an order in which at least some events are initiated by conditioning the event initiation on a trigger. For example, in some instances, event initiation by an operational unit may be conditional on receiving a trigger sent from another operational unit (a "node-originating trigger"). In other instances, event initiation by an operational unit may be conditional on receiving a trigger sent from the manager based on some other condition being met (a "manager-originating trigger"). In this respect, a system designed pursuant to the present disclosure may include multiple types of conditional event initiation—e.g., some based on a node-originating trigger from another operational unit, others based on a trigger originating from the manager, or a combination thereof. This is in contrast to conventional event-triggered systems that typically send triggers only directly from one node to the next.

By providing a mechanism enabling both node-originating triggers and manager-originating triggers, the system of the present disclosure may manage and control the program flow at the node level based on one or more objectives (e.g., more predictability, faster, better testability, etc.). For example, if control and predictability at a particular event or operational unit is less important, then that operational unit may be triggered directly by another operational unit by receiving a node-originating trigger, with the objective of reducing the amount of time between events. Such an embodiment may be particularly useful with systems that are designed to achieve a particular outcome in a time-sensitive context. For example, a computing system (e.g., autonomous-vehicle platform, infrastructure manager in a smart city or smart home, medical device and diagnostic, gaming device, etc.) may detect a condition (e.g., environmental condition using a hardware sensor); execute a cascade of successive operations to process the detected condition (e.g., quantify and/or qualify the environmental condition); and output a result of the processing (e.g., characterization of the condition). When the input is processed closer to the actual occurrence, it may be more likely that the output is reflective of the environmental condition in real time. In other words, because environmental conditions may change rapidly, the faster a system arrives at the output, the more reflective the output may be of the environmental condition in that moment. On the other hand, if control and predictability at a particular event or operational unit is more important, then that operational unit may be triggered by the manager by receiving a manager-originating trigger (and a node-originating trigger, in examples). In some instances, this additional control may provide an amount of predictability and testability helpful for some computing contexts not otherwise conducive to conventional event-based systems, such as safety-critical applications that require real-time execution of tasks. In addition, the ability to selectively use node-originating triggers may reduce overall runtime, which may be helpful for computing contexts designed to process a condition at an instant in time as close as possible to the actual occurrence of the condition (e.g., real-time systems).

Referring now to FIG. 1, FIG. 1 illustrates an example system 100 in accordance with an aspect of the present disclosure. The system 100 may generally include a set of nodes 110A-110F (e.g., work nodes), each of which represents a discrete event or task performed in an execution of a computer program. Although nodes 110A-110F are illustrated, this is not intended to be limiting, and any number of nodes may be included depending on the embodiment (e.g., nodes 110A-110N, where N represents a number of nodes for a current embodiment or implementation). In addition, the nodes 110A-110F may have various other dependencies, serial paths, parallel paths, branches, etc., in addition to or alternatively from those illustrated as examples in FIG. 1. In accordance with an aspect of the present disclosure, the system 100 may also include a manager 112 (e.g., software module or unit) monitoring and controlling the set of nodes 110A-110F. The manager 112 may receive event reports from, and send triggers to, one or more of the nodes 110A-F. Although certain components are illustrated with respect to the system 100, this is not intended to be limiting, and the system 100 may include additional or alternative components-such as one or more central processing units (CPUs), graphics processing units (GPUs), Digital Signal Processors (DSPs), System on Chips (SoCs), I/O devices, storage devices, etc.—which have been omitted from FIG. 1 for brevity.

Each node 110A-110F may represent different levels of abstraction within the system 100. For example, one or more of the nodes 110A-110F may include software executed on a programmable engine (e.g., CPU, GPU, DSP, SoC, etc.) or a hardware engine (e.g., fixed-function image signal processor (ISP), 2D transform, etc.). Each of the nodes 110A-110F may be executed on a same engine, or the nodes 110A-110F may be executed across different engines. In some aspects, one or more of the nodes 110A-110F may represent a discrete hardware component, such as separate integrated circuit, CPU, GPU, SoC, DSP, fixed-function ISP, 2D transform, etc. In at least one embodiment, one or more of the nodes 110A-110F may represent a separate computing device or system in a network. As such, the nodes 110A-110F may include software executed on a programmable engine or a hardware engine; a discrete hardware component; a computing device or system; or any combination thereof.

In an aspect of the present disclosure, events of the nodes 110A-110F may be executed in an order. For example, the nodes 110A-110F in FIG. 1 are illustrated in a flow or graph form—e.g., similar to a Directed Acyclic Graph (DAG)—with arrows depicting an order of operations. The graphical depiction of the nodes with arrows is merely an illustration to show an example order of node execution, and the nodes 110A-110F may not be physically or logically organized as depicted. To maintain the order, each node 110 may be programmed to wait to receive a trigger (e.g., hardware or software signal) before the node 110 is executed. A trigger may be provided from various sources. In some instances of the present disclosure, a trigger may be provided by another node (e.g., node-originating trigger). In other instances of the present disclosure, a trigger may be provided by the manager 112 (e.g., manager-originating trigger) or by some other component (not shown in FIG. 1) of the system 100.

In an example embodiment of the present disclosure, the node 110A receives a trigger 114A satisfying some condition initiating execution of the node 110A. Upon completion of one of more other conditions (e.g., completing all, or some portion of, an event), the node 110A transmits node-originating triggers 114B and 114C to the nodes 110B and 110C, respectively. The node-originating triggers 114B and 114C may be conditioned on the same condition, in which case they may be sent in parallel, or on different conditions, in which case one of the node-originating triggers 114B and 114C may be sent before the other. In a similar manner, each of the nodes 110B, 110D, and 110E transmits a respective node-originating trigger 114D, 114E, and 114F directly to a successive node upon satisfaction of some condition. In an aspect of the present disclosure, the system 100 represents a type of event-based system based on one or more of the nodes 110A-110F being conditioned on receiving a node-originating trigger, which is sent when a node event is satisfied.

In a further aspect of the present disclosure, the set of nodes 110A-110F comprising the event-based system also exchanges communications with the manager 112. As depicted in FIG. 1, the node 110A transmits an event report 116A to the manager 112, the event report 116A communicating a status of the node 110A. For example, the event report 116A may notify the manager 112 that an event of the node 110A has been completed or reached a particular stage and that the node-originating triggers 114B and 114C have been sent to nodes 110B and 110C, respectively. In addition, the event report 116A may include an output generated by the node 110A while executing the event. FIG. 1 depicts a plurality of event reports 116A, 116B, 116C, and 116D, which enable the manager 112 to monitor the set of nodes, including a status of the system, a time at which events are completed, output values, etc. Although not depicted in FIG. 1, other event reports may be sent from the node 110E and the node 110F. In a further aspect, the communications exchanged between the manager 112 and the event-based system of the nodes 110A-110F include manager-originated triggers. For example, the node 110E receives a manager-originating trigger 118 from the manager 112, upon the receipt of which the node 110E is executed. In this manner, the manager-originating triggers allow the manager 112 to control task execution in one or more select nodes.

The manager 112 may include various components operating to exchange communications with the nodes 110A-110F. For example, the manager 112 may include a communications interface 120, a monitoring manager 126, and a control manager 122. The communications interface 120 may leverage a communication protocol(s) to receive communications from, and send communications to, the nodes 110A-110F and/or other systems or elements of the system 100. The monitoring manager 126 may review communications (e.g., event reports) from one or more of the nodes 110A-110F to assess a status of a node, a set of nodes, a program, or any combination thereof. For example, a node or a set of nodes may be allocated a fixed time period in order to complete its event(s). As such, the monitoring manager 126 may track completion of each node or a set of nodes (e.g., based on the event reports) according to the fixed schedule. If a node or set of nodes fails to complete in an allotted time, then the failure may be reported. In this manner, the manager 112 may allow for real-time observation and verification of select events within the system 100. The control manager 122 may include a schedule 125 with predetermined conditions upon which triggers are to be sent to nodes. For example, the predetermined conditions may be time-based, event-based, or a combination thereof. When triggers are time-based, the control manager 122 may reference a universal clock 124 that is synchronized across the system 100 to determine when a time condition is met. Event-based conditions may be based on various events, including completion of events by the nodes 110A-110F or receipt of a trigger from some other node, device, and/or system. In some examples, the control manager 122 may receive event reports, or notifications of event reports, from the monitoring manager 126, or the control manager 122 may directly receive event reports. The control manager 122 may control the execution of a node in various manners, such as by sending a manager-originating trigger to the node when a predetermined condition is met.

Node-originating triggers may affect the system 100 differently than manager-originating triggers. For example, in some instances, downtime or latency between nodes may be shorter when node-originating triggers are used, as opposed to manager-originating triggers, since the trigger is more direct and does not also pass through a manager intermediary. Shorter downtime may contribute to faster runtime and higher resource utilization. On the other hand, using the manager 112 to exchange communications may contribute to more predictability and control, since a manager-originating trigger can be based on a universal timing device (e.g., the clock 124) or on some other predetermined event internal or external to the system.

In accordance with an aspect of the present disclosure, the system 100 may be designed to include various combinations of both node-originating triggers 110A-110F and manager-originating triggers 118. That is, when the events or tasks of a program are initially scheduled, node-originating triggers may be programmed for nodes at which less predictability or control is desired and/or where faster internode transition is more important, and manager-originating triggers may be programmed for nodes at which more control and predictability is important. As such, the present disclosure provides for the flexibility to schedule a program at the node level in a manner that selectively chooses for potential advantages of node-originating triggers or manager-originating triggers. This is in contrast to conventional event-based systems that typically rely only on node-originating triggers and that, as a result, tend to be less predictable and harder to test since the execution time by a node is variable. Furthermore, the inclusion of the manager 112 allows event reporting, which may be used to selectively observe the system at runtime. In contrast, a conventional event-based system may be harder to observe since the nodes trigger one another directly.

In other instances, the schedule 125 may be programmed to prioritize operations in various manners. For example, some event-based conditions may condition a node starting a task on completion of another task by a different node. Referring to FIG. 1, the manager-originating trigger 118 may be an event-based trigger conditioned on the node 110B completing a task or on the node 110D completing a task. Various considerations may be taken into account when assessing prioritization of tasks. For example, a task to be completed by the node 110B might be more safety critical, more time sensitive, or more resource intensive than a task to be completed by the node 110E. In that case, conditioning the manager-originating trigger 118 on receiving the event report 116B indicating completion of the task by the node 110B may permit the higher priority task of the node 110B to be completed first. This may also contribute to improved resource allocation. For example, if both the node 110B and the node 110E are executed by the same processor (e.g., GPU), then conditioning the manager-originating trigger 118 on receiving the event report 116B indicating completion of the task by the node 110B may permit the resources of the processor to be used to complete a task of the node 110B prior to starting a task of the node 110E.

Figure 2:
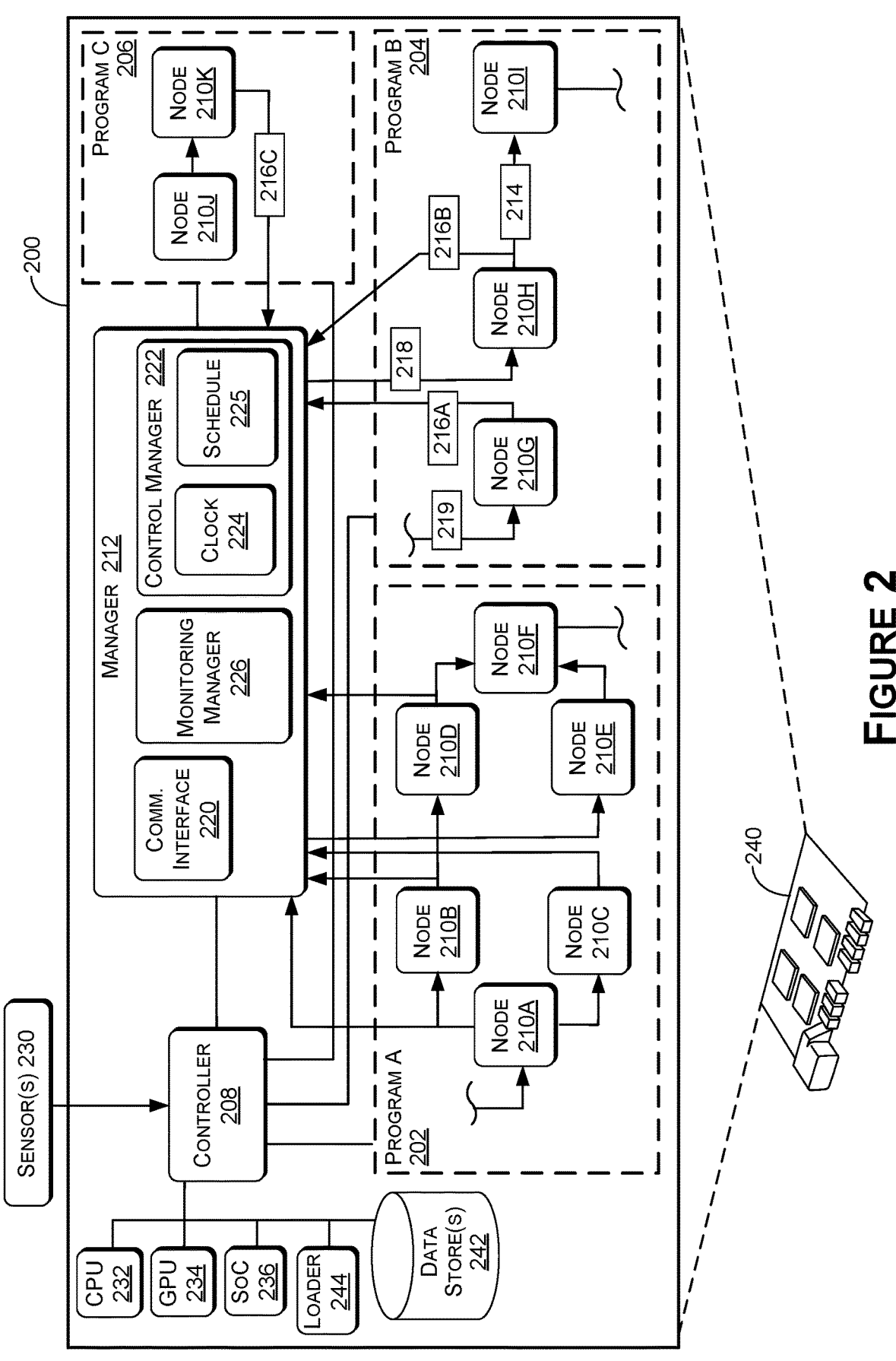
FIG. 2 is a block diagram of a larger system incorporating the system depicted in FIG. 1, in accordance with some embodiments of the present disclosure.

Referring now to FIG. 2, the system 100 of FIG. 1 is shown integrated within a larger system 200. For numbering consistency within FIG. 2, the nodes 110A-110F of FIG. 1 have been renumbered nodes 210A-210F, and the manager 112 has been renumbered 212—including the communications interface 220, the control manager 222, the clock 224, the schedule 225, and the monitoring manager 226. In addition, for example purposes, the nodes 210A-210F are organized under a program A 202, and the manager 212 may monitor and/or control the program A 202, as well as two additional programs—a program B 204 and a program C 206. The program B may include a respective set of nodes 210G-210I, and the program C may include a respective set of nodes 210J and 210K. As described with respect to FIG. 1, the manager 212 may receive event reports from, and send triggers to, one or more of the nodes 210A-K (and/or additional or alternative nodes 210 not illustrated, such as one or more additional nodes of the programs A-C, or nodes of other programs, devices, and/or systems).

Each of the manager 212, the program A 202, the program B 204, and the program C 206 may be executed by one or more hardware components (not depicted in FIG. 2). For example, the manager 212 may be executed by a CPU, GPU, and/or SoC, and each of the program A 202, the program B 204, and the program C 206 may be executed by the same hardware component(s) as the manager 212 or by a different CPU, GPU, SoC, etc. In addition, each of the nodes 210A-K depicted in FIG. 2 may also represents a discrete hardware component or engine.

In addition, the system 200 may include a controller 208 that interfaces between components of the system 200 and between components outside of the system (e.g., sensors 230). For example, the controller 208 may receive inputs from the sensor(s) 230 or from other components (e.g., CPU 232, GPU 234, and/or SoC 236) of the system 200 and route them to one or more of the program A 202, the program B 204, the program C 206, and/or the manager 212 for further processing. In addition, the controller 208 may receive outputs generated from the program A 202, the program B 204, the program C 206, and/or the manager 212 and route the outputs to one or more components, internal or external to the system 200. The system 200 is depicted as deployed on hardware 240. A non-limiting example of the hardware 240 is an NVIDIA DRIVE AGX Pegasus™ compute platform and/or an NVIDIA DRIVE PX Xavier™ compute platform. In other examples, the system 200 may include additional components and/or alternative components. For example, one or more of the CPU 232, GPU 234, and SoC 236 may be omitted or organized outside of the system 200. Also, the system 200 may include other hardware components that execute the manager 212, the program A 202, the program B 204, and/or the program C 206.

The system 200 may operate in some ways similar to the system 100, including the communication exchange between the nodes 210A-K and the manager 212. For example, the nodes 210G-210I of the program B 204 may be ordered using both node-originating triggers and manager-originating triggers. As depicted in FIG. 2, the node 210H is triggered by a manager-originated trigger 218, and the node 210I is triggered by the node-originating trigger 214. In addition, the nodes 210G-210I may send event reports (e.g., event reports 216A and 216B) to the manager 212.

Furthermore, in accordance with an aspect of the present disclosure, the program A 202 and the program B 204 may be executed on the same engine, on different homologous engines, or on different heterogeneous engines, all of which may be used by the manager 212 to provide monitoring and/or control at select nodes in furtherance of chosen objectives (e.g., predictability, testability, faster runtime, etc.). In each of these aspects (e.g., same engine, different homologous engines, or different heterogeneous engines with the manager 212), the program A 202 and the program B may be parts of a larger program that includes the combination of the nodes 210A-210I, and the trigger 219 received by the node 210G may be a node-originating trigger from the node 210F.

The system 200 of FIG. 2 may further include other elements. For example, manager-originating triggers may be conditioned on various types of events, such as receiving an input from the controller 208 or receiving an event report from another program (e.g., event report 216C from the program C 206). In addition, FIG. 2 depicts data store(s) 242, which may store the programs A, B, and C and a loader 244 (e.g., task loader) that may retrieve the programs A, B, and C from the datastore(s) at runtime for execution by the nodes 210A-210K (e.g., using some type of processor). Furthermore, the sensor(s) 230 may include certain types of sensors, depending on an environment of the system 200. For example, the system 200 may be deployed in a real-world (e.g., physical) object in real-world environments, such as a vehicle (e.g., autonomous, semi-autonomous, or non-autonomous); a robot; a drone; an unmanned aerial vehicle (UAV); a water vessel; construction equipment; an emergency response vehicle; a virtual reality system; a gaming system, etc. As such, the sensor(s) 230 may be to detect a condition of the environment or condition of the system or the object in the environment. The sensors may include, without limitation, global navigation satellite systems sensor(s) (e.g., Global Positioning System sensor(s)); RADAR sensor(s); ultrasonic sensor(s); LIDAR sensor(s); inertial measurement unit (IMU) sensor(s) (e.g., accelerometer(s), gyroscope(s), magnetic compass(es), magnetometer(s), etc.); microphone(s); stereo camera(s); wide-view camera(s) (e.g., fisheye cameras); infrared camera(s); surround camera(s) (e.g., 360 degree cameras); long-range and/or mid-range camera(s); speed sensor(s) (e.g., for measuring the speed of the vehicle); vibration sensor(s); steering sensor(s); brake sensor(s); and/or other sensor types.

In a further aspect of the present disclosure, the program A 202 may receive inputs from the sensor(s) 230, and the inputs may be used to detect a condition of the environment or the object in which the system 200 is deployed at an instant in time. Furthermore, the program A 202 includes the nodes 210A-210F which may process the input and provide an output reflective of the environment condition in real time (e.g., at an instant in time that corresponds (or nearly corresponds) with the actual occurrence of the condition). Furthermore, the program A 202, the program B 204, and/or the program C 206 may collectively process hundreds or thousands of inputs to help direct operations of the system 200 or an object in which the system 200 is deployed. In some instances, the operations of the programs A, B, and/or C are to be executed under predetermined time constraints, which may contribute to an object (e.g., autonomous vehicle) safely operating under changing environmental conditions. In accordance with an aspect of the disclosure, the manager 212 combined with the event-based scheduling (e.g., node-originating triggers) enable the program to be observed at runtime and designed at the node level to select for potentially faster event triggering or more predictability.

Various flow diagrams are described in this disclosure (e.g., FIGS. 3 and 4), and each block described herein, may comprise a computing process that may be performed using any combination of hardware, firmware, and/or software. For instance, various functions may be carried out by a processor executing instructions stored in memory. The methods represented by the flow diagrams may also be embodied as computer-usable instructions stored on computer storage media. The methods may be provided by a standalone application, a service or hosted service (standalone or in combination with another hosted service), or a plug-in to another product, to name a few. In addition, methods are described, by way of example, with respect to the system of FIGS. 1 and 2. However, these methods may additionally or alternatively be executed by any one system, or any combination of systems, including, but not limited to, those described herein.

FIG. 3 is a flow diagram showing a method 300 for monitoring and control of a program flow in an event-triggered system, in accordance with some embodiments of the present disclosure. The method 300, at block B302, includes generating a representation of a program including a plurality of nodes in an order, each node associated with a task within the program. For example, in FIG. 2, the nodes 210A-210F represent nodes of one or more processors that may execute a program. A representation of the program A 202 including the nodes 210A-210F may be generated when the loader 244 retrieves the program from the datastore(s) 242 for execution at runtime, and each of the nodes 210A-210F may be associated with a respective task within the program A 202.

The method 300, at block B304, includes transmitting a node-originating trigger between a first node and a second node subsequent to the first node in the order, the node-originating trigger indicating an event-based condition has been met based on completion of a respective task of the first node. For example, the node-originating trigger 114D (FIG. 1) may be transmitted from the node 110B (210B in FIG. 2) to the node 110D, and the node-originating trigger 114D may indicate to the node 110D that an event-based condition has been met, such as completion of a task of the node 110B.

The method 300, at block B306, includes based on the respective task having been completed, transmitting an event report to a manager monitoring execution of the plurality of nodes. For example, the event report 116B may be transmitted to the manager 112 when a task of the node 110B is completed.

Turning now to FIG. 4, FIG. 4 is a flow diagram showing a method 400 for monitoring and control of a program flow in an event-triggered system in the context of a vehicle (e.g., autonomous, semi-autonomous, or non-autonomous). The method 400, at block B402, includes receiving sensor data generated by one or more sensors of a vehicle. For example, one or more sensors 230 may generate an input that is received by the controller 208, the manager 212, one or more of the programs A, B, and C, or any combination thereof.

The method 400, at block B404, includes applying the sensor data to a program configured to generate an output using the sensor data. For example, the sensor data may be applied to the program A 202, the program B, the program C, or any combination thereof.

The method 400, at block B406, includes executing the program to generate the output. In FIG. 4, the operation represented by block B406 is depicted to include various steps, starting with block B408.

The method, at block B408, includes generating an ordered representation of the program across a plurality of nodes, each associated with a respective task within the program. For example, an ordered representation of the program A 202 may be generated when the program A 202 is loaded by the loader 244. In the example of FIG. 2, the ordered representation of the program A 202 includes the nodes 210A-210F, each of which is associated with a respective task of the program A.

The method, at block B410, includes executing a first task associated with a first node of the plurality of nodes. For example, the node 210A (also identified as the node 110A in FIG. 1) may execute a first task associated therewith.

The method, at block B412, includes, responsive to executing the first task, transmitting an event report to a manager monitoring the execution of the program and a node-originating trigger to a second node. For example, the node 110A (also identified as the node 210A in FIG. 2) may transmit the event report 116A to the manager 112 and the node-originating trigger 114B to the node 110B (also identified as the node 210B in FIG. 2). The node 110B is subsequent to the node 110A in the ordered representation.

The method, at block B414, includes, based on a condition being met, transmitting, by the manager, a manager-originating trigger to the second node. For example, although not depicted in FIG. 1 or in FIG. 2, a manager-originating trigger may be transmitted from the manager to the node 110B. The condition may be a time-based condition, an event-based condition, or any combination thereof.

The method, at block B416, includes, based on receiving the node-originating trigger and the manager-originating trigger, executing a second task associated with the second node. For example, the node 110B may execute a second task associated therewith based on receiving the node-originating trigger 114B and on receiving a manager-originating trigger (not shown in FIG. 1).

The method, at block B418, includes performing one or more operations by the vehicle based on the output of the program. For example, an output may be presented (e.g. audibly, visually, tactilely, etc.) or an operation of the vehicle might be performed (e.g., accelerate, decelerate, apply brakes, steer left, steer right, continue straight, etc.).

Figure 5:
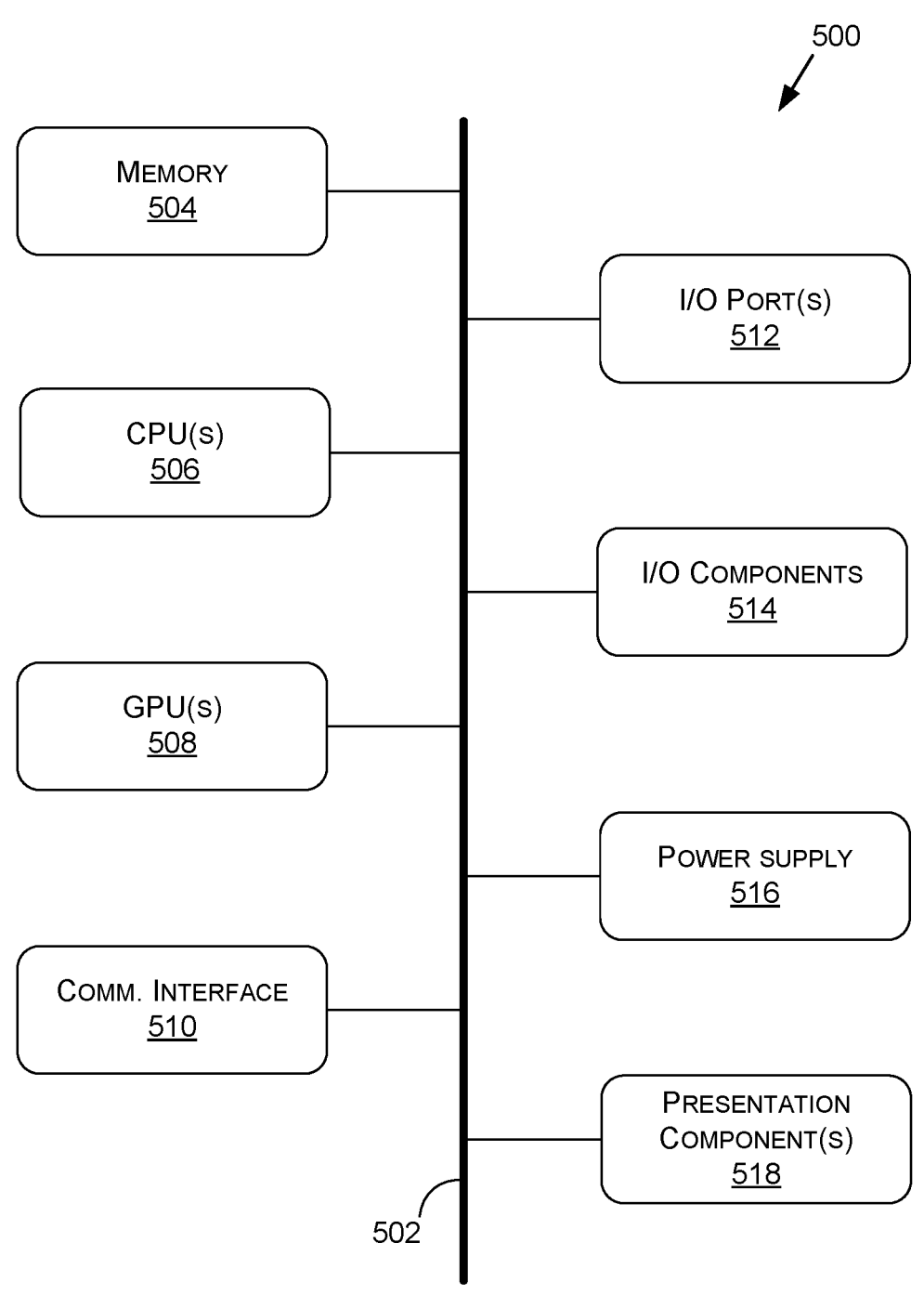
FIG. 5 depicts a block diagram of a computing device, in accordance with some embodiments of the present disclosure.

FIG. 5 is a block diagram of an example computing device 500 suitable for use in implementing some embodiments of the present disclosure. Computing device 500 may include a bus 502 that directly or indirectly couples the following devices: memory 504, one or more central processing units (CPUs) 506, one or more graphics processing units (GPUs) 508, a communication interface 510, input/output (I/O) ports 512, input/output components 514, a power supply 516, and one or more presentation components 518 (e.g., display(s)).

Although the various blocks of FIG. 5 are shown as connected via the bus 502 with lines, this is not intended to be limiting and is for clarity only. For example, in some embodiments, a presentation component 518, such as a display device, may be considered an I/O component 514 (e.g., if the display is a touch screen). As another example, the CPUs 506 and/or GPUs 508 may include memory (e.g., the memory 504 may be representative of a storage device in addition to the memory of the GPUs 508, the CPUs 506, and/or other components). In other words, the computing device of FIG. 5 is merely illustrative. Distinction is not made between such categories as "workstation," "server," "laptop," "desktop," "tablet," "client device," "mobile device," "handheld device," "game console," "electronic control unit (ECU)," "virtual reality system," and/or other device or system types, as all are contemplated within the scope of the computing device of FIG. 5.

The bus 502 may represent one or more busses, such as an address bus, a data bus, a control bus, or a combination thereof. The bus 502 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 504 may include any of a variety of computer-readable media. The computer-readable media may be any available media that may be accessed by the computing device 500. The computer-readable media may include both volatile and nonvolatile media, and removable and non-removable media. By way of example, and not limitation, the computer-readable media may comprise computer-storage media and communication media. In some aspects, the memory 504 may store one or more programs, such as the program A 202, the program B 204, and the program C 206.

The computer-storage media may include both volatile and nonvolatile media and/or removable and non-removable media implemented in any method or technology for storage of information such as computer-readable instructions, data structures, program modules, and/or other data types. For example, the memory 504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 500. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 506 may be configured to execute the computer-readable instructions to control one or more components of the computing device 500 to perform one or more of the methods and/or processes described herein. For example, the CPU(s) 506 may execute one or more of the nodes 210A-210K to perform one or more tasks of the program A 202, the program B 204, or the program C 206. In addition, the CPU(s) 506 may execute the manager 212 while the nodes are being executed. The CPU(s) 506 may each include one or more cores (e.g., one, two, four, eight, twenty-eight, seventy-two, etc.) that are capable of handling a multitude of software threads simultaneously. The CPU(s) 506 may include any type of processor, and may include different types of processors depending on the type of computing device 500 implemented (e.g., processors with fewer cores for mobile devices and processors with more cores for servers). For example, depending on the type of computing device 500, the processor may be an ARM processor implemented using Reduced Instruction Set Computing (RISC) or an x86 processor implemented using Complex Instruction Set Computing (CISC). The computing device 500 may include one or more CPUs 506 in addition to one or more microprocessors or supplementary co-processors, such as math co-processors.

The GPU(s) 508 may be used by the computing device 500 to render graphics (e.g., 3D graphics) or perform other computing operations. For example, the GPU(s) 508 may execute one or more of the nodes 210A-210K to perform one or more tasks of the program A 202, the program B 204, or the program C 206. In addition, the GPU(s) 508 may execute the manager 212 while the nodes are being executed. The GPU(s) 508 may include hundreds or thousands of cores that are capable of handling hundreds or thousands of software threads simultaneously. The GPU(s) 508 may generate pixel data for output images in response to rendering commands (e.g., rendering commands from the CPU(s) 506 received via a host interface). The GPU(s) 508 may include graphics memory, such as display memory, for storing pixel data. The display memory may be included as part of the memory 504. The GPU(s) 708 may include two or more GPUs operating in parallel (e.g., via a link). When combined together, each GPU 508 may generate pixel data for different portions of an output image or for different output images (e.g., a first GPU for a first image and a second GPU for a second image). Each GPU may include its own memory, or may share memory with other GPUs.

In examples where the computing device 500 does not include the GPU(s) 508, the CPU(s) 506 may be used to render graphics.

The communication interface 510 may include one or more receivers, transmitters, and/or transceivers that enable the computing device 700 to communicate with other computing devices via an electronic communication network, included wired and/or wireless communications. The communication interface 510 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 512 may enable the computing device 500 to be logically coupled to other devices including the I/O components 514, the presentation component(s) 518, and/or other components, some of which may be built in to (e.g., integrated in) the computing device 500. Illustrative I/O components 514 include a microphone, mouse, keyboard, joystick, game pad, game controller, satellite dish, scanner, printer, wireless device, etc. The I/O components 514 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 500. The computing device 500 may be include depth cameras, such as stereo-scopic camera systems, infrared camera systems, RGB camera systems, touchscreen technology, and combinations of these, for gesture detection and recognition. Additionally, the computing device 500 may include accelerometers or gyroscopes (e.g., as part of an inertia measurement unit (IMU)) that enable detection of motion. In some examples, the output of the accelerometers or gyroscopes may be used by the computing device 500 to render immersive augmented reality or virtual reality.

The power supply 516 may include a hard-wired power supply, a battery power supply, or a combination thereof. The power supply 516 may provide power to the computing device 500 to enable the components of the computing device 500 to operate.

The presentation component(s) 518 may include a display (e.g., a monitor, a touch screen, a television screen, a heads-up-display (HUD), other display types, or a combination thereof), speakers, and/or other presentation components. The presentation component(s) 518 may receive data from other components (e.g., the GPU(s) 508, the CPU(s) 506, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including handheld devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter may also be embodied in other ways, to include different processes or combinations of processes similar to the ones described in this document, in conjunction with other present or future technologies. Moreover, although the terms "step," "process," and/or "block" may be used herein to connote different elements of methods employed, the terms should not be interpreted as implying any particular order among or between various processes herein disclosed unless and except when the order of individual processes is explicitly described.

What is claimed is:

1. A method comprising:

monitoring, based at least on an execution graph representative of a program, execution of one or more first tasks of a plurality of tasks of the program, the execution graph including a plurality of nodes corresponding to respective tasks of the plurality of tasks and edges defining an execution flow of the plurality of tasks among the plurality of nodes;

based at least on the monitoring, determining one or more conditions for triggering one or more nodes of the plurality of nodes in the execution graph are satisfied, the one or more conditions corresponding to completion of one or more portions of the one or more first tasks; and based at least on the determining, transmitting one or more manager-originating triggers to the one or more nodes, wherein the one or more nodes are programmed to enforce, in response to receiving one or more node-originating triggers, an execution order of the plurality of tasks in the execution flow based at least on delaying initiating one or more second tasks of the plurality of tasks until the one or more manager-originating triggers are received.

2. The method of claim 1, wherein the one or more conditions include at least one of one or more time-based conditions, one or more resource-based conditions, or one or more status-based conditions.

3. The method of claim 1, wherein output of the program is used to direct one or more operations of an autonomous or semi-autonomous machine in an environment.

4. The method of claim 1, further comprising prior to initiating the execution flow, programming, based at least on a representation of the execution order, the one or more nodes to, responsive to the receiving of the one or more node-originating triggers, delay the initiating until the one or more manager-originating triggers are received.

5. The method of claim 1, wherein the determining the one or more conditions are satisfied uses one or more event reports sent from and generated by at least one of the plurality of nodes, the one or more event reports indicating a start or an end of a task of the one or more first tasks.

6. The method of claim 1, wherein the execution is used to control one or more of:

an autonomous or semi-autonomous vehicle;

artificial intelligence-assisted video monitoring;

an artificial intelligence-assisted diagnostic device; or an artificial intelligence-assisted surgical device.

7. The method of claim 1, wherein the transmitting is responsive to detecting the one or more conditions are satisfied.

8. A system comprising:

one or more combinations of one or more hardware components to execute operations including:

applying sensor data obtained using one or more sensors of a machine in an environment to a program to cause execution of an execution graph representative of the program to detect one or more conditions corresponding to the environment, the execution graph including a plurality of nodes corresponding to respective tasks of a plurality of tasks and edges defining an execution flow of the plurality of tasks among the plurality of nodes; and based at least on a determination, using one or more status indicators of one or more first tasks of the plurality of tasks that correspond to one or more first nodes of the plurality of nodes, that one or more conditions for triggering one or more second nodes of the plurality of nodes in the execution graph are satisfied, providing one or more manager-originating triggers to the one or more second nodes, wherein the one or more second nodes are programmed to enforce, in response to receiving one or more node-originating triggers from one or more other nodes of the plurality of nodes, an execution order of the plurality of tasks in the execution flow based at least on delaying initiation of one or more second tasks of the plurality of tasks until the one or more manager-originating triggers are received, the one or more second tasks using the one or more combinations of the one or more hardware components to control the machine in the environment.

9. The system of claim 8, wherein output of the program is reflective of one or more environmental conditions corresponding to the environment in real time.

10. The system of claim 8, wherein the one or more conditions include at least one of one or more time-based conditions, one or more resource-based conditions, or one or more status-based conditions.

11. The system of claim 8, wherein the execution order is predetermined by an ordered representation of the program.

12. The system of claim 8, wherein the determination uses one or more event reports sent from and generated by at least one of the one or more first nodes, the one or more event reports indicating a start or an end of a task of the one or more first tasks.

13. The system of claim 8, wherein the machine includes one or more of:

an autonomous or semi-autonomous vehicle;

an artificial intelligence-assisted diagnostic device; or an artificial intelligence-assisted surgical device.

14. The system of claim 8, wherein a node of the plurality of nodes represents a discrete hardware component, a computing device, or a computing system.

15. The system of claim 8, wherein the system is comprised in at least one of:

a control system for an autonomous or semi-autonomous machine;

a perception system for an autonomous or semi-autonomous machine;

a system implemented using a robot;

a system for performing one or more artificial intelligence-assisted video monitoring operations;

a system for performing one or more artificial intelligence-assisted diagnostic device operations;

a system for performing one or more artificial intelligence-assisted surgical device operations; or a system for presenting at least one of virtual reality content or augmented reality content.

16. At least one processor comprising:

one or more circuits to provide one or more manager-originating triggers to one or more nodes of a plurality of nodes in an execution graph representative of a program based at least on:

monitoring, based at least on the execution graph, execution of one or more first tasks of a plurality of tasks of the program, the execution graph including the plurality of nodes corresponding to respective tasks of the plurality of tasks and edges defining an execution flow of the plurality of tasks among the plurality of nodes; and based at least on the monitoring, determining one or more conditions for triggering the one or more nodes in the execution graph are satisfied, the one or more conditions corresponding to completion of one or more portions of the one or more first tasks, wherein the one or more nodes are programmed to enforce, in response to receiving one or more node-originating triggers from one or more other nodes of the plurality of nodes, an execution order of the plurality of tasks in the execution flow based at least on delaying initiation of one or more second tasks of the plurality of tasks until the one or more manager-originating triggers are received.

17. The at least one processor of claim 16, wherein the one or more conditions include at least one of one or more time-based conditions, one or more resource-based conditions, or one or more status-based conditions.

18. The at least one processor of claim 16, wherein output of the program is reflective of one or more environmental conditions detected by the program and corresponding to an environment in real time, and the output is used to direct one or more operations of an autonomous or semi-autonomous machine in the environment.

19. The at least one processor of claim 16, wherein the delaying causes the one or more nodes to initiate the one or more second tasks after the completion of the one or more first tasks.

20. The at least one processor of claim 16, wherein the at least one processor is comprised in at least one of:

a control system for an autonomous or semi-autonomous machine;

a perception system for an autonomous or semi-autonomous machine;

a system implemented using a robot;

a system for performing one or more artificial intelligence-assisted video monitoring operations;

a system for performing one or more artificial intelligence-assisted diagnostic device operations;

a system for performing one or more artificial intelligence-assisted surgical device operations; or a system for presenting at least one of virtual reality content or augmented reality content.

* * * * *